May 15, 1928. W. HERSLEB Re. 16,960

PAINT CONTAINER FOR SPRAY APPLIANCES

Original Filed Sept. 21, 1925

Inventor:
William Hersleb
by Albert Scheible Attorney

Reissued May 15, 1928. Re. 16,960

UNITED STATES PATENT OFFICE.

WILLIAM HERSLEB, OF CHICAGO, ILLINOIS, ASSIGNOR TO BINKS SPRAY EQUIPMENT CO., OF CHICAGO, ILLINOIS, A CORPORATION OF ILLINOIS.

PAINT CONTAINER FOR SPRAY APPLIANCES.

Original No. 1,583,927, dated May 11, 1926, Serial No. 57,589, filed September 21, 1925. Application for reissue filed October 26, 1927. Serial No. 228,939.

My invention relates to closures for containers, its general object being that of providing a container construction which will afford a tight closing of the container when desired and in which the tightly closing cover can instantly be attached. More particularly, my invention provides a container comprising a main member (or receptacle) and a cover member, provides the cover member with cover retaining means including portions disposed so as to be engaged by or disengaged from portions of the receptacle by a relative rotation of the cover with respect to the receptacle, and provides simple means on the cover member for forcing the cover towards the receptacle after the said portions of the receptacle have been engaged by the cover retaining means.

More particularly, my invention provides a receptacle having a pair of lateral projections near its mouth, a cover for the receptacle, a thrust member movably mounted on the cover and provided with portions adapted to underhang the said projections, and cam means for moving the thrust member with respect to the cover so as to force the cover against the container. Furthermore, my invention provides a construction for this purpose in which the cam means can be mounted on a single member which connects the thrust member to the cover and which member may be tubular so as to afford an outlet for the container. Still further and also more detailed objects will appear from the following specification and from the accompanying drawings, in which:

Figure 1:
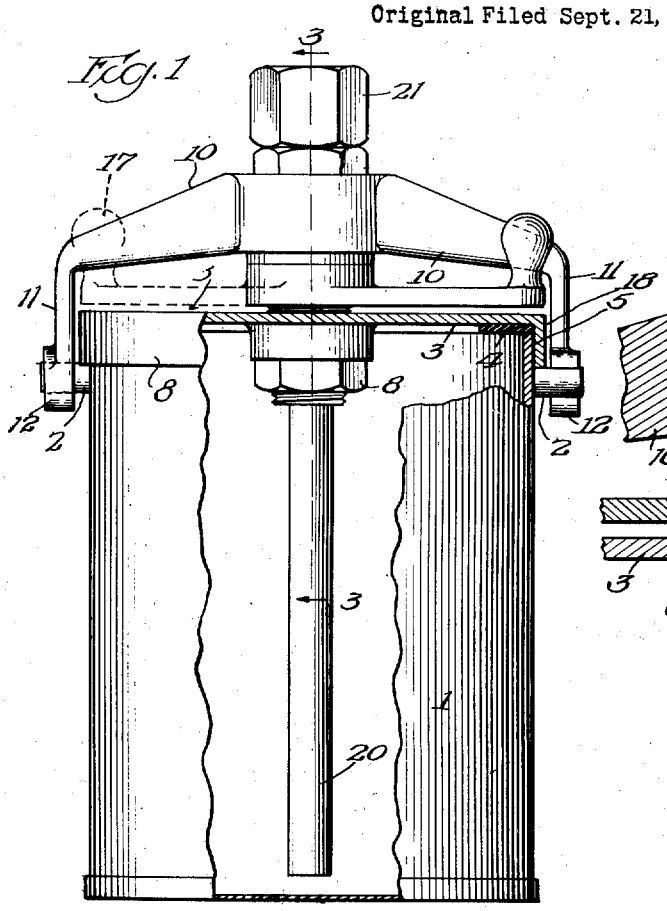
Fig. 1 is an elevation of a paint cup for a spraying appliance, showing this as embodying my invention.
Figure 3:
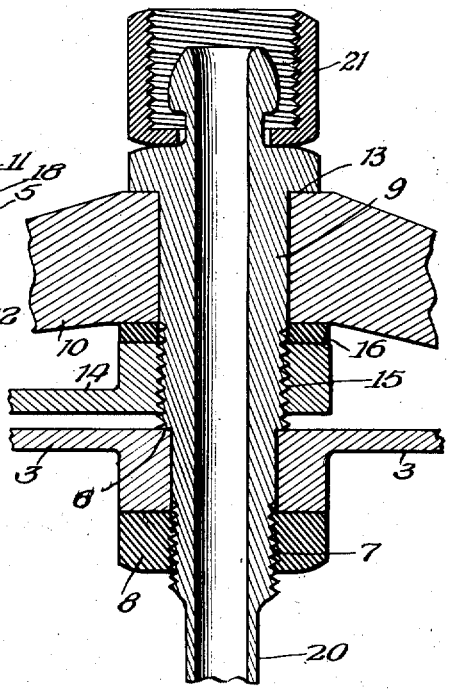
Fig. 3 is an enlarged and fragmentary central and vertical section through the upper portion of Fig. 1, taken along the line 3—3 of that figure.
Figure 4:
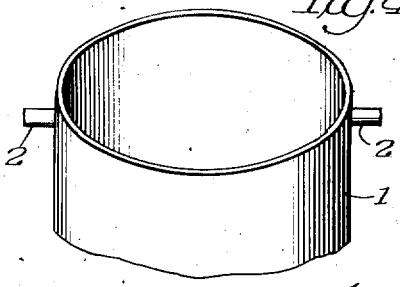
Fig. 4 is a perspective view of the upper portion of the paint cup or container of Fig. 1.

In constructing paint spraying appliances of the type in which the atomizer or spray appliance proper is mounted directly on a cup or other container, it has heretofore been difficult to combine a tight sealing of the container with convenience in opening or closing the latter. The liquids used in such appliances usually are of a quick drying nature, so that they will readily gum any threads on both the cup and the cover, thereby making it difficult for the user to detach a cover which is secured to the container in the usual threaded manner. On the other hand, arrangements heretofore employed for insuring a tight seal between a cup or other container and a slip-on or telescoping cover have usually been both complicated and difficult of manipulation.

My present invention aims to overcome both of these sets of objections and aims to do so in a quite simple and inexpensive construction. Since my invention in its immediate commercial prospects is particularly applicable for use in connection with paint spraying apparatus, I am illustrating and describing it in a corresponding embodiment, although I do not wish to be limited to any particular use for what is here disclosed.

In the embodiment of the drawings, the paint container includes an upwardly open receptacle 1 carrying a pair of pins 2 which extend diametrically of the receptacle and project outwardly from opposite sides of the receptacle at some distance below the top or mouth end of the receptacle. The cover 3 for this receptacle 1 carries a washer 4 which seats on the upper end of the receptacle, and the cover also has a downwardly directed peripheral flange 5 which telescopes over the mouth end of the receptacle. Extending through a central perforation in the cover 3 is a stem member (here shown as tubular) which has an annular shoulder 6 engaging the top of the cup, and which also has a threaded portion 7 extending through the said perforation, so that the cover can be clamped against the said shoulder by tightening a nut 8 which is threaded on the said portion 7 of the stem member, thus nonrotatably fastening the said stem member to the cover, so that the cover and the stem member together constitute a rigid cover member.

The stem member also has a more elevated cylindrical portion 9 which extends slidably through a corresponding perforation in the center of a yoke or thrust member 10. This yoke reaches beyond the opposite sides of the cover and has a pair of downwardly directed arms 11, each of which arms is equipped at its lower end with a hook 12 which opens circumferentially of the container and which hook has a portion adapted to underhang one of the said pins 2.

The slidable extension of the tubular member or riser stem through the yoke permits gravity to slide to yoke downwardly with respect to the said stem and the cover. However, I preferably provide means for limiting the upward movement of the yoke with respect to the said stem and the cover, so that the cover may be raised by lifting the yoke. For this purpose, I am here showing the stem or tubular member as having a shoulder 13 disposed for engaging the top of the yoke 10.

To clamp the cover 3 tightly against the mouth of the receptacle when the hooks on the yoke have engaged the projecting pins 2 on the receptacle, I provide means for raising the yoke with respect to the cover, desirably in the form of a raising member mounted for rotation about the tubular stem. This raising member, together with the tubular stem, the yoke and the means for limiting upward movement of the yoke preferably are mounted on the cover member so as to be retained in their relative operative dispositions, so that the resulting assembly can be manipulated as a unit when detached from the receptacle. For this purpose, I am here showing the raising member in the form of a lever 14 threaded on a portion 15 of the riser stem above the cover 3. I am also showing a washer 16 interposed between the raising member 14 and the bottom of the yoke, so as to reduce friction, but do not wish to be limited to the inclusion of a washer, since the latter operatively forms a part of either the yoke or the raising member in so far as the lifting action of the latter is concerned. The lever 14 preferably carries a handle 17 whereby it can be moved rotationally about the axis of the tubular member, and the threading of the said lever on the corresponding part 15 of the tubular member is such that the limited rotational movement permitted by possible engagements of the handle 17 with the yoke 10 will still afford a sufficient lowering or lifting movement to the lever and the yoke for effecting a clamping or releasing of the cover.

Figure 2:
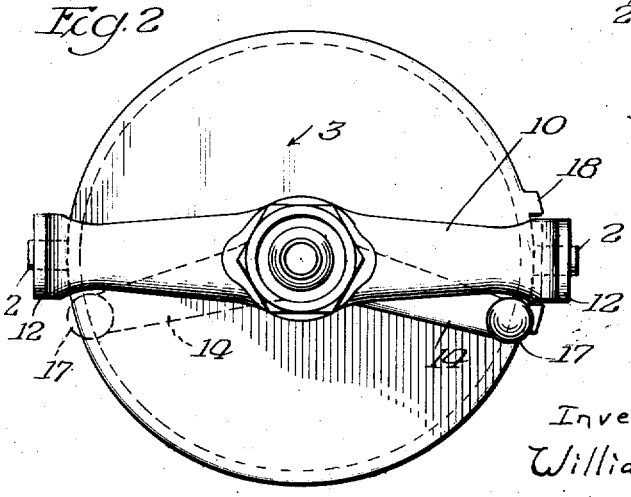
Fig. 2 is a plan view of the same.
Figure 5:
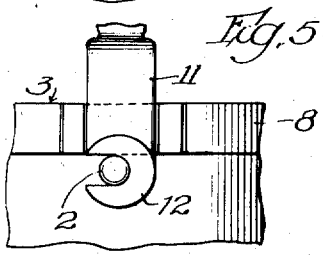
Fig. 5 is a fragmentary elevation of the paint cup of Fig. 1, taken at right angles to that figure to show the releasable interlocking of the projections on the cup with the ends of the thrust member or yoke carried by the cover.

When the cover member is detached from the cup or can, the lever carried by the cover member is in a lowered position, as that shown in dotted lines in Fig. 2, thereby permitting gravity to lower the yoke so that the latter is out of engagement with the stop 13. The cover can then be slipped over the mouth of the receptacle and the hooks on the yoke can be brought into straddling relation to the pins 2 (as shown in Fig. 5) by a partial rotation of the cover member on the receptacle. To facilitate this, I desirably provide means upon the cover member for preventing rotation of the yoke with respect to the cover, thereby permitting the cover to be rotated by rotational movement of the yoke and also permitting the user to grasp the yoke for holding the cover from rotation while he is moving the thrust member. For these purposes, I am here showing the cover as having a pair of edge lugs 18 between which one of the depending arms 11 on the yoke extends.

After the cover in the illustrated embodiment has been partially rotated so as to bring the hooks into operative relation to the projecting pins 12, the lever (or raising member) 14 is moved in a direction which is counterlockwise in Fig. 2, namely, the direction in which the thread on the bore 15 causes the lever to move upwardly on the tubular member, thereby also raising the washer 16 and the yoke 10. Since the lower portion of each hook 12 through its engagement with the corresponding pin 2 resists a bodily lifting of the yoke, the result of this lifting action of the lever with respect to the yoke or thrust member is a depressing of the cover, thereby compressing the packing 4 and insuring a tight closure between the cover and the can. When the container is to be opened, a movement of the thrust member in the opposite direction releases this pressure, thereby permitting the cover member to be rotated to bring the hooks out of alignment with the pins 2 and then allowing the cover member to be lifted bodily off the receptacle.

In employing such a construction in a spraying appliance, the stem member is desirably tubular and has an extension 20 reaching down into the cup 1 to a point near the bottom of the latter, and the stem member also desirably includes a union nut 21 swiveled on its upper end for making a tight connection to the atomizing or spraying part of the appliance. Thus arranged, the shoulder 6 and the nut 8 cooperate in sealing the tubular member with respect to the cover, and any gumming of the threads 7 will only tighten this seal. On the other hand, the threaded connection between the thrust member and the tubular member is not reached by the paint or other liquid in the appliance, so that this can not become gummed up. Hence I entirely avoid the difficulties heretofore encountered with containers having covers screwed on their cups, although employing a quite simple and easily manipulated construction and one in which the needed seal is effected by the compressing of a cheap and easily replaced packing ring.

Since the various connections to the stem member still permit this to have an unthreaded bore when this stem member is tubular, so as to form a discharge pipe for the receptacle. Consequently, this bore is not likely to clog and can easily be cleaned if necessary. So also, the parts attached to the stem member can easily be removed by merely detaching the nut 8 and then rotating the yoke on the cover. When thus rotated, the yoke engages the handle 17 on the cam lever and rotates the latter also, hence the yoke affords a lever for unscrewing the cam lever, just as it also affords a convenient handle for lifting the cover member when loose or for normally lifting the entire appliance.

Broadly speaking, it will be noted that the raising member 14 is mounted for rotation about the axis of the stem member, which stem member is here shown as tubular; that the raising member is operatively interposed between two parts of the cover member, namely the stem member and the yoke or thrust member. One of the two parts between which the raising member is operatively interposed—namely, the stem member—has the raising member threaded on it, so that rotation of the raising member moves the latter longitudinally of the stem. The other of the two parts between which the raising member is operatively interposed—namely, the thrust member (or yoke)—has a shouldered engagement with the raising member, which raising member is here shown in the form of a handled lever. Consequently, the said respectively threaded and shouldered engagements with the members between which the raising member is interposed cause a rotational movement of the raising member in one direction to lift the thrust member which is here pictured as a yoke.

However, while I have illustrated and described my invention in an embodiment including highly desirable details of construction and arrangements, I do not wish to be limited to these, since many changes might obviously be made without departing either from the spirit of my invention or from the appended claims.

I claim as my invention:

1. A container comprising an upwardly open receptacle; a cover fitting the mouth of the receptacle; a thrust member supported by the cover with freedom for vertical movement with respect to the cover, the thrust member and the receptacle having coacting portions adapted to be engaged or disengaged by rotational movements of the thrust member with respect to the receptacle in respectively opposite directions; and thrust means operatively interposed between the cover and the thrust member for forcibly raising the thrust member with respect to the cover, the cover and the thrust member having interengaging parts for preventing rotation of the thrust member on the cover.

2. A container comprising an upwardly open receptacle and a cover fitting the mouth of the receptacle, a thrust member mounted on the cover for movement toward or away from the receptacle, the thrust member and the receptacle having coacting portions adapted to be engaged or disengaged by rotational movements of the thrust member with respect to the receptacle in respectively opposite directions, a stem member fast upon the cover and extending slidably through the thrust member, and a lever threaded on the stem member and supporting the thrust member, the thrust member having portions disposed in the path of rotational movement of a part of the lever, so that the lever can be screwed upon or unscrewed from the said stem member by rotating the thrust member with respect to the cover.

3. A container comprising an upwardly open receptacle, a cover fitting the mouth of the receptacle, a stem member fast on the cover and extending upwardly from the cover, a yoke slidably mounted for vertical movement on the stem member, the stem member having a shoulder for limiting the upward sliding of the yoke thereon, the yoke and the receptacle having interengageable parts for limiting the lifting of the yoke with respect to the receptacle, a handled-lever threaded upon the stem member between the yoke and the cover and engaging the bottom of the yoke for lifting the yoke with respect to the stem member, the stem member being hollow and extending downward through the cover into the receptacle to afford a connection to liquid within the receptacle.

4. A container for paint or the like, comprising an upwardly open receptacle; a cover member including a cover fitting the mouth of the receptacle, and a discharge pipe fast upon the cover and extending through the cover into the receptacle; a thrust member slidable on the pipe above the cover, the thrust member and the receptacle having coacting portions adapted to be engaged or disengaged by rotational movements of the thrust member in relation to the receptacle in respectively opposite directions; interengaging means on the thrust member and the cover member for preventing relative rotation thereof; and means operatively interposed between the cover member and the thrust member for raising the thrust member with respect to the cover member.

5. A container for paint or the like, comprising an upwardly open receptacle; a cover member including a cover fitting the mouth of the receptacle, and a discharge pipe fast upon the cover and extending through the cover into the receptacle; a thrust member slidable on the pipe above the cover, the thrust member and the receptacle having coacting portions adapted to be engaged or disengaged by rotational movements of the thrust member in relation to the receptacle in respectively opposite directions; interengaging means on the thrust member and the cover member for preventing relative rotation thereof; and a raising member and rotatable about the axis of the pipe and interposed between the thrust member and the pipe; the raising member being threaded upon one and having shouldered engagement with the other of the members between which it is interposed, whereby rotational movement of the raising member in one direction raises the thrust member with respect to the cover.

6. A container for paint or the like, comprising an upwardly open receptacle; a cover member including a cover fitting the mouth of the receptacle, and a stem member fast upon the cover and extending upwardly from the cover; a yoke having a medial portion above the cover and having arms depending laterally beyond and at opposite sides of the cover, the said arms and the receptacle having coacting portions adapted to be engaged or disengaged by rotational movements of the yoke in relation to the receptacle in respectively opposite directions, the medial yoke portion having a perforation through which the stem member freely extends to permit gravity to slide the yoke downwardly; the yoke and the cover member having interengaging portions arranged to prevent rotation of the yoke on the cover member while permitting relative vertical movement; and means supported by and rotatable about the stem member for raising the yoke with respect to the cover member.

7. A container comprising a receptacle and a cover fitting the mouth of the receptacle; a thrust member mounted on the cover for movement toward or away from the receptacle, the thrust member and the receptacle having coacting portions adapted to be engaged or disengaged by rotational movements of the thrust member with respect to the receptacle in respectively opposite directions; a discharge pipe extending through and fast upon the cover and having an upper portion extending slidably through the thrust member, means upon the said pipe for limiting the upward sliding of the thrust member; and raising means rotatable about the pipe and operatively interposed between the said pipe and the thrust member for raising the thrust member with respect to the cover.

Signed at Chicago, Illinois, September 30th, 1927

WILLIAM HERSLEB.